Fig. 1.

G. A. LEE.
MACHINE FOR PACKAGING LOOSE SUBSTANCES.
APPLICATION FILED MAY 1, 1906.

1,026,356.

Patented May 14, 1912.
9 SHEETS—SHEET 2.

Inventor:
George Aubrey Lee,

Witnesses

By Dodge and Sons,
Attorneys

G. A. LEE.
MACHINE FOR PACKAGING LOOSE SUBSTANCES.
APPLICATION FILED MAY 1, 1906.

1,026,356.

Patented May 14, 1912.
9 SHEETS—SHEET 3.

Witnesses:

Inventor:
George Aubrey Lee,
By Dodge and Sons,
Attorneys

G. A. LEE.
MACHINE FOR PACKAGING LOOSE SUBSTANCES.
APPLICATION FILED MAY 1, 1906.

1,026,356.

Patented May 14, 1912.
9 SHEETS—SHEET 4.

Witnesses:

Inventor:
George Aubrey Lee
By Dodge and Sons,
Attorneys

G. A. LEE.
MACHINE FOR PACKAGING LOOSE SUBSTANCES.
APPLICATION FILED MAY 1, 1906.

1,026,356.

Patented May 14, 1912.
9 SHEETS—SHEET 5.

Witnesses
Inventor
George Aubrey Lee
By Dodge and Sons,
Attorneys.

G. A. LEE.
MACHINE FOR PACKAGING LOOSE SUBSTANCES.
APPLICATION FILED MAY 1, 1906.

1,026,356.

Patented May 14, 1912.

Witnesses:
C. H. Rauder.
Fannie Wise

Inventor:
George Aubrey Lee,
By Dodge and Sons,
Attorneys

G. A. LEE.
MACHINE FOR PACKAGING LOOSE SUBSTANCES.
APPLICATION FILED MAY 1, 1906.

1,026,356.

Patented May 14, 1912.
9 SHEETS—SHEET 8.

Inventor:
George Aubrey Lee,
By Dodge and Sons,
Attorneys.

G. A. LEE.
MACHINE FOR PACKAGING LOOSE SUBSTANCES.
APPLICATION FILED MAY 1, 1906.

1,026,356.

Patented May 14, 1912.

Witnesses:

Inventor:
George Aubrey Lee,
By Dodge and Sons,
Attorneys.

UNITED STATES PATENT OFFICE.

GEORGE AUBREY LEE, OF YONKERS, NEW YORK, ASSIGNOR TO AUTOMATIC PACKING & LABELING COMPANY, OF DURHAM, NORTH CAROLINA, A CORPORATION OF NORTH CAROLINA.

MACHINE FOR PACKAGING LOOSE SUBSTANCES.

1,026,356.

Specification of Letters Patent.

Patented May 14, 1912.

Application filed May 1, 1906. Serial No. 314,714.

*To all whom it may concern:*

Be it known that I, GEORGE AUBREY LEE, a citizen of the United States, residing at Yonkers, in the county of Westchester and State of New York, have invented certain new and useful Improvements in Machines for Packaging Loose Substances, of which the following is a specification.

My present invention pertains to improvements in machines for packaging loose substances, particularly granular or flaky material, such as tobacco and the like.

The invention will be best understood upon reference to the annexed drawings, wherein:

Fig. 28 a side elevation of the cam and lever acting therewith which produces the movement of the parts just referred to; Fig. 29 a detail view, partly in section, of the pawl-carrier and toothed collar secured to the form turret shaft; and Fig. 30 a similar view of the same parts.

The main object of my invention is to produce a compact and efficient machine for the purpose in view, that is, accurately weighing the material to be packed, filling the package, compressing the charge, closing the package, and, finally, if desired, applying a stamp or band to the package thus closed.

With the particular embodiment of the invention herein shown the machine is especially adapted to the handling of granular or flaky material, such for instance as scrap tobacco or cigar cuttings. In packing tobacco in paper bags, two bags are used, one nested within the other, the inner bag being preferably waterproof.

The essential features of the machine comprise two overlapping turrets or carriers which work in conjunction with each other, one being a form-carrier which presents the form with the bag or bags thereon to the feed hopper and then carries it in line with the underlying package-carrying turret. This second turret, which receives the bag with the compressed charge, then presents said charged bag to folding and closing mechanism, after which the closed package is automatically presented to a previously-pasted and automatically positioned stamp or label which is automatically applied to the infolded end of the package. The packages thus completed are transferred through the action of the machine to a carrier, where they are retained a sufficient length of time to permit the paste employed to become thoroughly dried.

A still further feature of merit in the present machine resides in the means employed for automatically presenting the bag forms, with the bags thereon, to the turret and likewise discharging the empty and stripped forms from the turret and moving the same out of the path of rotation of the turret.

Another object of the invention is to provide an improved bag-closing mechanism, one member of the mechanism acting in the dual capacity of a folder and an ironer or flap-retaining member for the infolded portions of the bag.

A still further object is to provide an indenting, crimping or upsetting device arranged to act upon the infolded flaps of the package in such a manner as to cause them to remain in their folded position, thus doing away with the necessity of applying paste to such parts.

Other features of construction and design which are of material advantage are also present and will be hereinafter more fully set forth and pointed out.

Referring to the drawings, 1 denotes the bed or table of the machine, supported upon suitable interconnected and braced legs 2, the parts being made sufficiently heavy to render the machine stable and to afford proper support and bearing for the driving shafts and other parts.

Figure 1:
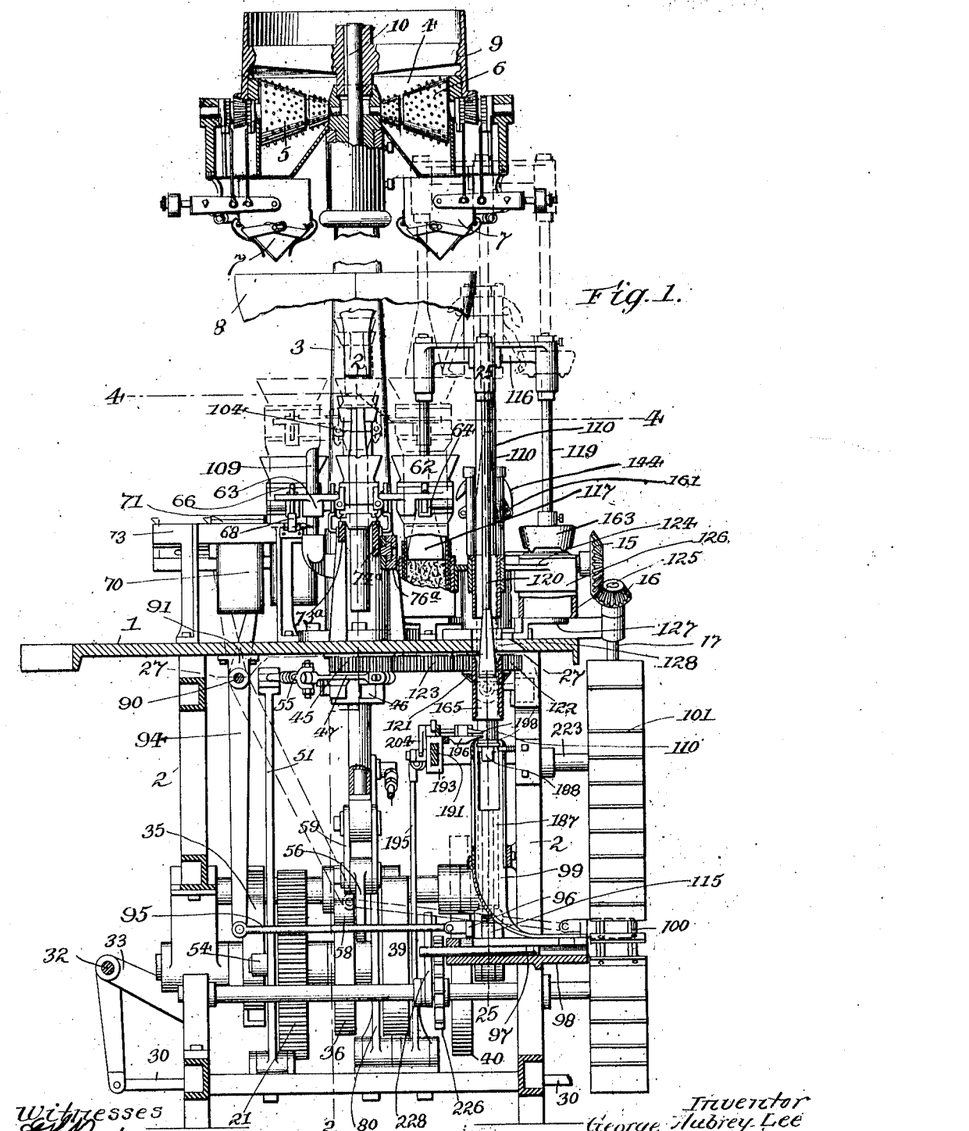
Figure 1 is a vertical sectional view on the line 1—1 of Fig. 2, the weighing mechanism, which is omitted from said Fig. 2, being also shown in section.

Extending upwardly from the table is a vertical post or column 3 which forms the support for the weighing mechanism, said mechanism herein shown, see Fig. 1, comprising a series of feed hoppers or chambers 4 having feed rolls 5, 6 mounted therein, a scale-pan 7 arranged beneath each hopper, and a hopper or receptacle 8 common to all of the pans and receiving the material discharged therefrom.

Figure 10:
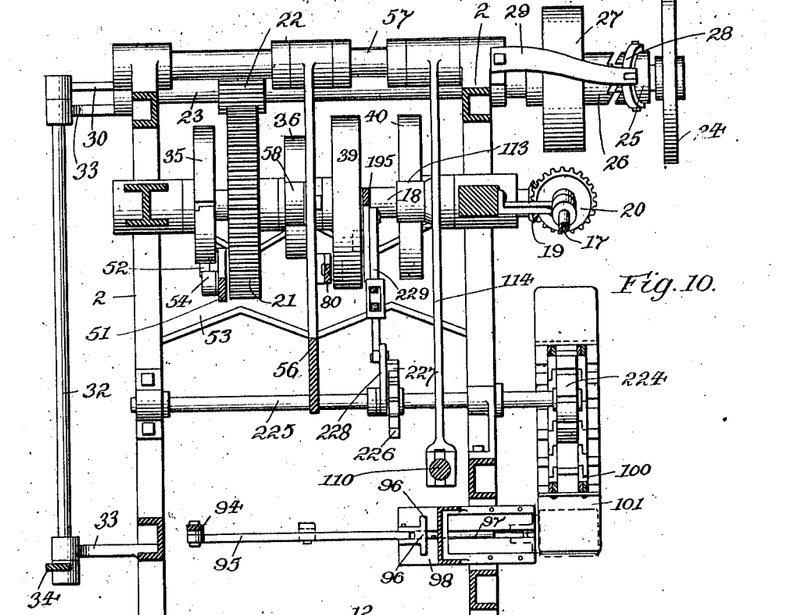
Fig. 10 a horizontal sectional view, on the line 10—10 of Fig. 2.
Figure 11:
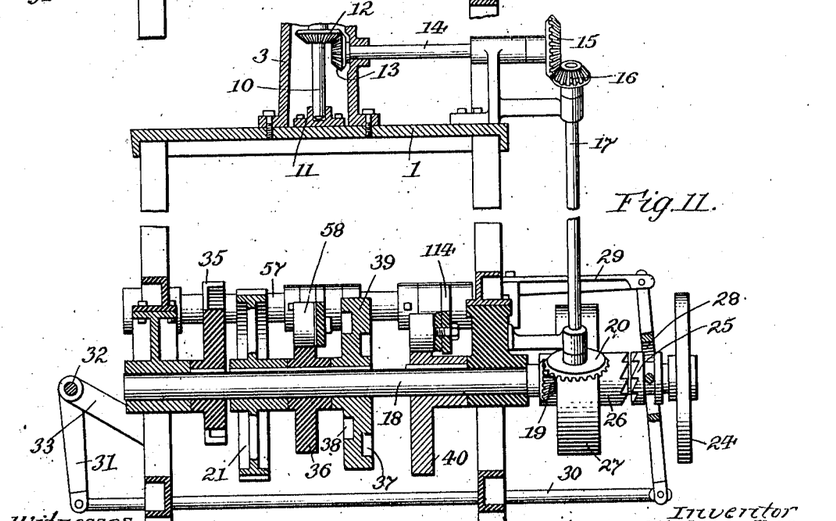
Fig. 11 a vertical sectional view, on the line 11—11 of Fig. 2.

The rolls and other actuated parts of the weighing mechanism are driven by an actuating member 9 secured to the upper end of a shaft 10, the lower end of which rests in a step bearing 11, see Fig. 11, secured to the bed 1 within the post or column 3. Said shaft 10 carries a bevel-gear 12 which meshes with a similar gear 13 secured to horizontally-disposed countershaft 14. A gear 15 on the outer end of said shaft meshes with a gear 16 carried by a shaft 17, said shaft in turn receiving its motion from a shaft 18 and interposed gears 19 and 20. Shaft 18 carries a gear 21 which meshes with a pinion 22 secured upon the main driving shaft 23. Said shaft 23 is provided with a fly-wheel 24 at one end and likewise with a sliding clutch member 25 which works in conjunction with a similar member 26 formed upon the hub of the loose driving pulley 27. The slidable clutch member is actuated through a yoke-piece 28, fulcrumed at its upper end to an arm or bracket 29 secured to and extending outwardly from one of the legs 2. A rod 30 connects the lower end of the yoke to an arm 31, said arm in turn being secured to a shaft 32 journaled in brackets 33, 33, Fig. 10, an actuating lever 34 being secured to the opposite end of said shaft and projecting upwardly therefrom at the side of the table in easy reach of the attendant who places the forms or holders, with the bags thereon, upon the form-feeding device.

Secured to shaft 18 is a series of cams, the first being designated as 35 and serving primarily to rotate the turrets, to revolve the package-tumbler, and to actuate the stamp-presenting mechanism. The second cam 36 serves to raise and lower the form-carrying turret. The third and fourth cams 37 and 38 are formed as ways in a single casting 39, secured to shaft 18, the former serving to actuate the stamp-withdrawing and positioning mechanism, and also the mechanism for moving the package-carrier or elevator, while the latter (38) actuates the form-presenting and withdrawing means, and also the bunter which forces the packages into the elevator. The last cam, 40, of the series acts to raise or lower the rod or column which carries the packer, the folding mechanism, the indenter, and the package-transferring rod or member.

Figures 2, 3:
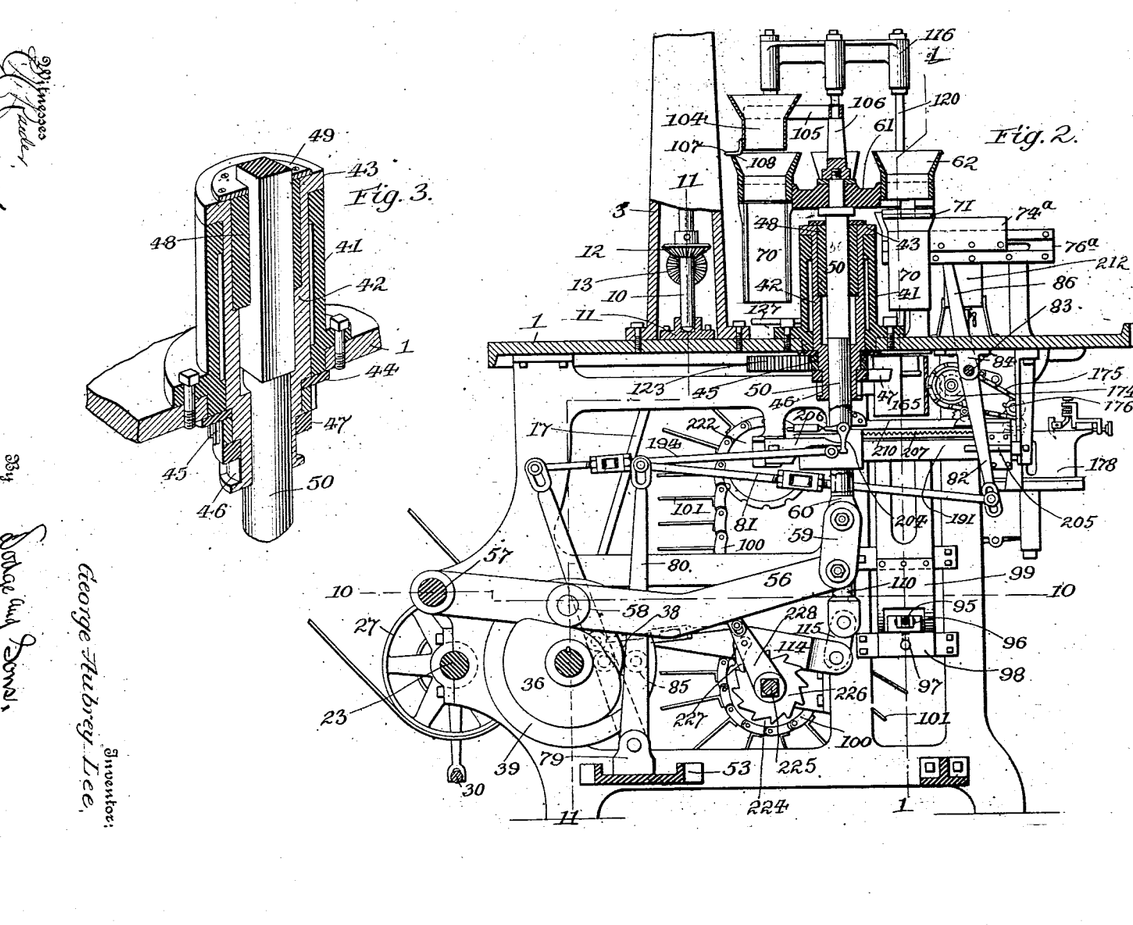
Fig. 2 a similar view, on the line 2—2 of Fig. 1.
Fig. 3 a sectional perspective view of a portion of the bed, a section of the bag-form turret shaft, the bearing for said shaft, and a portion of the attendant parts, whereby the shaft may be positively rotated and likewise raised and lowered.

The bed or table is provided with an opening at approximately the center thereof, see Figs. 2 and 3, and a hollow column or post 41 is secured to the table at this point, the lower end of the column extending into the opening and making a neat fit therewith, while the laterally-extending flange of the column has a fair bearing upon the upper face of the table to which it is bolted. A sleeve 42, having a laterally-projecting flange 43, which rests upon the upper end of the column, extends downwardly therethrough, the inwardly-projecting portions of said column being bored and dressed so as to afford a smooth bearing for the sleeve. The lower end of said sleeve is reduced, and a washer 44 encircles the upper part of the reduced portion, lying immediately below the lower end of the column and overlapping against the under face of the bed. A gear 45 is splined upon the sleeve, while the lower end of the sleeve is provided with a series of pockets 46 which in effect form ratchet-teeth, see Figs. 29 and 30. The sleeve, immediately above the pockets 46, is formed with an annular groove in which works a pawl-carrier 47, made of two pieces and secured together in a manner best shown in Fig. 27. The upper end of the sleeve is bored out and a bushing 48, having a square opening extending therethrough is shrunk therein. A washer 49 overlies these parts. The lower end of the sleeve is provided with a cylindrical bore, and a shaft 50, the lower portion of which is cylindrical in cross-section while the upper portion is square, extends through the bushing and sleeve in a manner best shown in Fig. 3. From this it will be seen that any rotary motion imparted to the sleeve 42 will be transmitted to the shaft, while the latter may be moved freely endwise through the sleeve and bushing.

Figure 27:
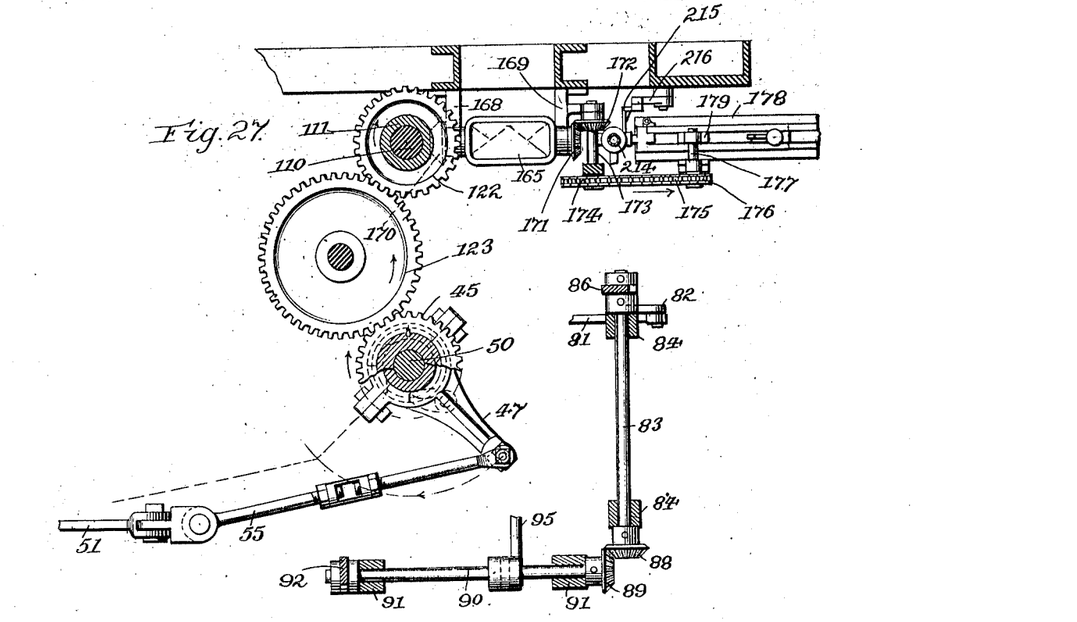
Fig. 27 a horizontal sectional view on the line 27—27 of Fig. 1, illustrating the manner of transmitting power to effect a step-by-step movement of the turret shafts; to cause a periodical semi-rotation of the tumbler or package-reversing mechanism, and a feeding of the stamps to a position where they may be grasped by the stamp-presenting devices.
Figures 28, 29, 30:
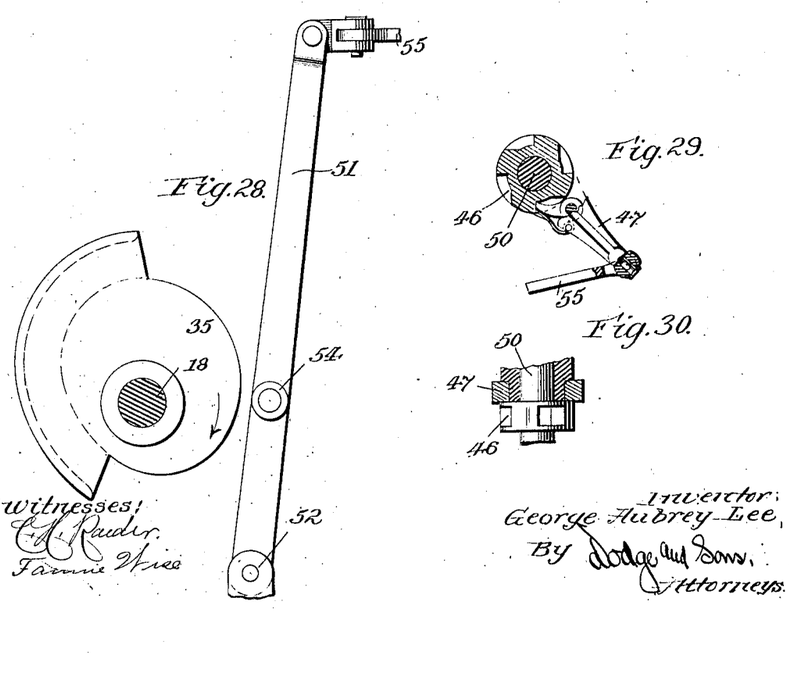

A lever or arm 51, see Figs. 1, 27 and 28, is fulcrumed between two upstanding lugs 52, carried by a cross-bar 53 extending from one leg or support 2 to another. Said arm carries a bowl 54 which stands in line with cam 35, the arm being rocked upon its pivot by reason of engagement of the bowl by the cam as it rotates in the direction of the arrow in Fig. 28. The arm is connected at its upper end by an adjustable link 55 to the pawl-carrier 47. For each complete revolution of the cam 35 the sleeve 42 will be given a quarter turn and as a consequence the shaft 50 will make a quarter revolution.

An arm or lever 56, see Figs. 2, 10 and 11, fulcrumed on a shaft 57, carries a bowl 58 which overlies the cam 36, the outer end of the arm being connected to a link 59 which in turn is connected to a swivel-block 60, mounted in the lower end of shaft 50. Cam 36 is so timed as to raise the arm and thus elevate the shaft previous to rotation thereof through the action of cam 35, as just described. The purpose of this will presently appear.

Figures 8, 9:
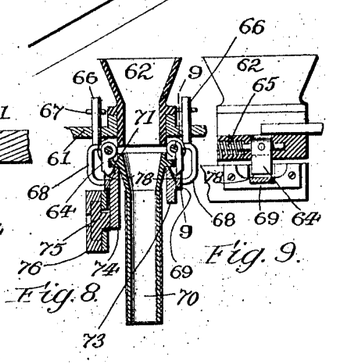
Fig. 8 a transverse vertical sectional view on the line 8—8 of Fig. 7.
Fig. 9 a vertical sectional view, on the line 9—9 of Fig. 8.

Securely mounted upon the upper end of the shaft 50 is a casting or turret 61, provided with four radially-disposed, equally-spaced hoppers or funnels 62, the turret being likewise provided with four depending hollow lugs or hubs 63, spaced midway between the adjacent funnels. The funnels by preference will be formed separately from the turret, as indicated most clearly in Fig. 8, being provided with laterally-extending flanges which rest upon the upper face of the turret-frame or casting, while the lower contracted portion makes a close fit with the walls of ways or recesses formed in the turret frame or casting. Each funnel is provided with two downwardly-extending hooks 64, pressed inwardly at their lower ends toward each other by springs 65 which encircle the pivot-pins of the hooks, as best shown in Fig. 9. A gravitating locking-pin 66 is provided for each hook, the pins passing through openings formed in the turret and extending downwardly adjacent to the sides of the hooks. As the turret is raised these pins pass downwardly and prevent the hooks from swinging outward under stress of the weight of the bag-form or carrier. A through-pin 67 prevents the locking-pin from passing downwardly through the opening. When the turret is lowered, in the act of releasing one of the forms or engaging one of them, the pins 66 are elevated by arms 68, which stand adjacent to the hooks when the same are in their lower position, said arms being formed as a part of a plate or casting 69 which is secured to the tracks or ways upon which the bag-shapes or forms are placed. While the hooks under ordinary conditions will, by reason of the action of the springs 65, engage the outwardly-projecting flanges of the bag-shapes or forms, still should any foreign material become lodged between the parts, or the parts become worn, the locking-pins will absolutely hold the hooks in position, and thus prevent the forms from becoming disengaged.

The bag-shape or holder 70, shown in section in Fig. 8, comprises a funnel-shaped portion, the opening in the upper end of which is as large as the discharge end of the funnel 62, and a lower portion which in cross-section has the same form as the finished package. In the form illustrated the holder is oblong in cross-section. A wing 71 extends from each side of the funnel or flared upper portion of the shape or holder, said wings serving to support the shapes when they are positioned preparatory to being taken up by the turret after having the bags placed thereon, and also when the holders with the bags stripped therefrom are discharged from the turret.

Figure 4:
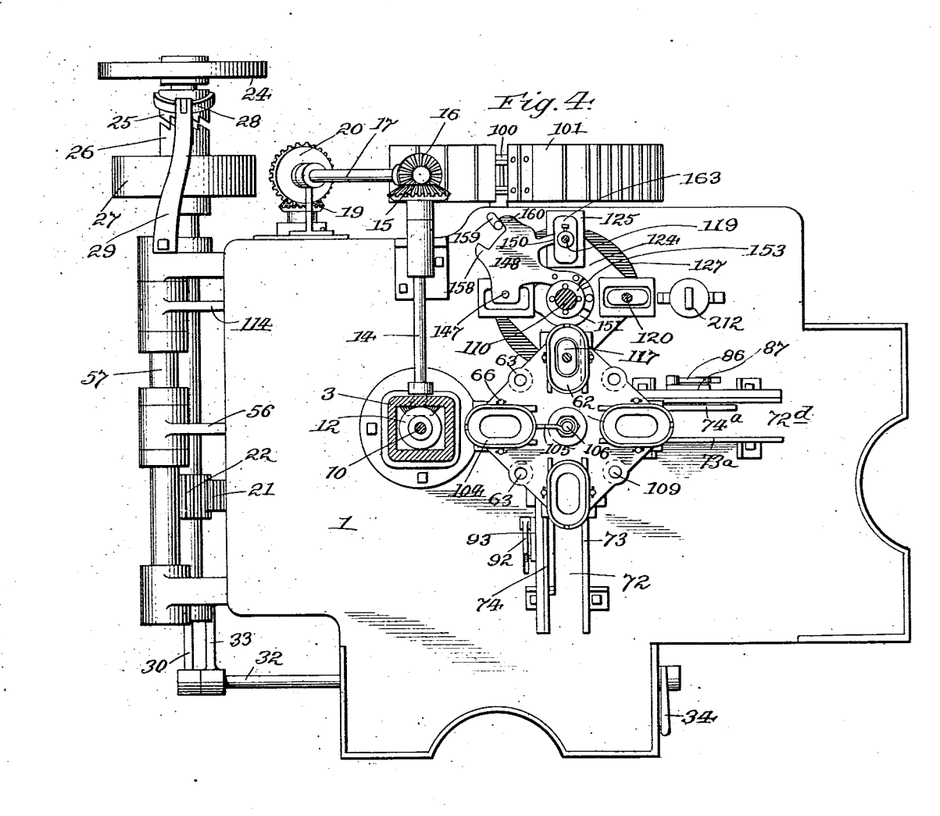
Fig. 4 a horizontal sectional plan view, the line of section being indicated by the line 4—4 on Fig. 1.

Adjacent to the station designated by 72, Fig. 4, and termed the "feed" or "shape-feed" station, and also at the station designated by 72[d] and termed the "discharge" station, are located suitable tracks and actuating mechanisms or devices for positioning and removing the shapes. At the "feed" station (Figs. 1, 4, 5, 7 and 8) there is provided a fixed track or support 73, sustained by suitable arms secured to the bed or table.

Figure 7:
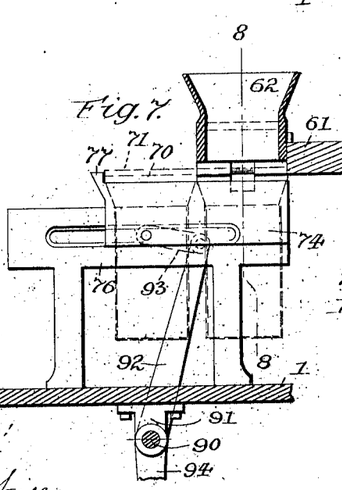
Fig. 7 a longitudinal sectional view of the form-presenting mechanism, the forms or bag-holders being shown in dotted lines only.

74 designates the movable track or support which stands parallel to the fixed track 73 and is connected to a slide 75 mounted and movable longitudinally in a way formed in the fixed member or guide 76. The movable track, as will be seen upon reference to Fig. 7, is of a length equal to that of two of the funnels of the bag-shapes or holders, and is provided with an upstanding lug or ear 77 which engages one of the wings 71 and moves the form, with the two outermost bags thereon, inwardly toward the turret, the innermost form being directly positioned beneath the funnel 62 which stands at that time in exact alinement therewith. Each track is provided with a cut-away portion or recess 78, which when the movable track reaches its innermost limit stands in line with the hooks or latches 64, said latches riding over the wings 71 as the turret is lowered and engaging the under face thereof. As the turret rises into the position shown by dotted line in Fig. 1 the form, with the bags thereon, is raised with it.

The form-discharging mechanism is of substantially the same construction, comprising a fixed track 73$^a$, a movable track 74$^a$, a guide or member 76$^a$, a lug or ear 77$^a$, placed in this instance at the inner end of the movable track, and recesses 78$^a$. The tracks and beveled recesses (see Fig. 6) are so proportioned as to cause the latches to ride from beneath the wings 71 and thus free the form when the turret is lowered. The movable track is then moved outwardly, withdrawing the shape from beneath the turret-hopper or funnel 62.

To effect the reciprocation of the movable tracks or supports the following mechanism is employed, particular reference being had to Figs. 1, 2, 5, 7 and 27: Pivotally secured to a casting 79, mounted upon the cross-bar 53, is an arm or lever 80, said arm having pivotally connected to its upper end an adjustable link 81 which in turn is pivotally connected to the lower end of an arm 82, said arm, as will best be seen upon reference to Fig. 27, being secured to a shaft 83 journaled in bearings or brackets 84, secured to the under side of the bed or table. Arm 80 carries a roller 85 which works in the cam groove 38 so that the shaft 83, through the connections just described, has an oscillating movement imparted to it. An arm 86 is secured to one end of the shaft 83, said arm extending upwardly through an opening formed in the table, and connected to a link 87 which in turn is pivotally connected to the movable or reciprocating track 74$^a$. The shaft 83 is provided with a bevel-gear 88, which meshes with a similar gear 89 secured to a shaft 90 which is mounted beneath the table in suitable brackets or bearings 91. To the opposite end of shaft 90 is secured an arm 92, which extends up through an opening in the table and is connected by a link 93 with the movable track or support 74.

As will be seen upon reference to Figs. 1 and 27, the shaft 90 has secured to it a downwardly-extending arm or lever 94, to the lower end of which is pivotally connected a rod 95 said rod carrying at its outer free end a bunter or push-plate 96, see Fig. 10. The plate has connected to it a guide-rod 97, see Figs. 2, 10 and 25, which rod works in a groove or channel formed in a supporting bed or plate 98 which is secured to the uprights or legs of the machine. Said bunter works across the lower end of a discharge chute or way 99, the lower end being curved outwardly from a vertical to a horizontal position, the outer end terminating in line with the elevator formed of an endless chain 100, each link of which carries a vane or shelf 101. As the completed packages are forced downwardly upon the chute or way 99, the bunter carries them outward one by one into the pockets of the elevator formed between the vanes 101.

Figures 19, 20:
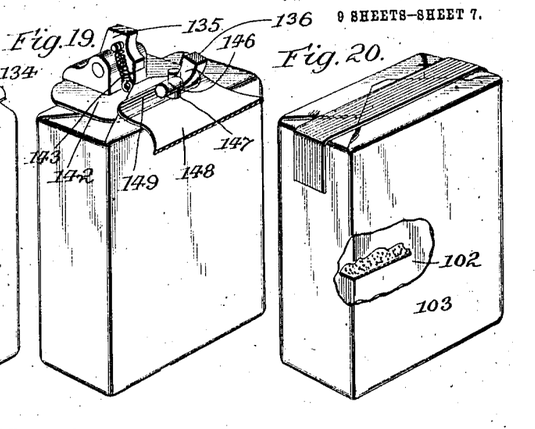

The parts are so timed that the turret 61 moves upwardly to its full extent, carrying with it one of the bag-shapes or holders previously positioned upon the tracks 73 and 74, and automatically engaged by the hooks 64, and is then given a quarter turn. As the turret begins its upward travel the movable tracks or supports are moved outwardly, tracks 74 being placed in position to receive another form and tracks 74$^a$ traveling outward with the stripped form which may be lifted off by the attendant at the station 72$^d$. Before the turret is again lowered, the bags are moved inwardly, the ears 77 pushing the forms inward so that the innermost form stands directly beneath the hopper 62, which at that moment is in line therewith. The form previously withdrawn from the turret and having bags thereon, namely, the moisture-proof bag 102 (Fig. 20) and the outer, preferably printed, bag 103, is carried beneath a hopper 104; while the turret is still elevated, in which position it receives an exact charge from the weighing mechanism before described.

The main hopper 8 discharges into the secondary hopper 104 just referred to, which secondary hopper, as will be seen upon reference to Fig. 2, is carried by an arm 105, which encircles the upper reduced end of a post 106 secured to the upper end of the shaft 50. The secondary hopper or funnel 104 will likewise be provided with an outwardly-projecting arm or finger 107 (Fig. 2) which will rest in a notch 108 (see Fig. 5) formed in the upper edge of the funnels 62. This arm or finger 107 thus brings the secondary funnel 104 into exact position with relation to the funnel 62, and will prevent the material from being scattered or wasted, thereby insuring a full charge to each bag.

As will be noted, the form being filled receives the bulk of its charge while it is elevated. It is then lowered and raised while still in line with the hopper or funnel 104 before being moved laterally in line with the packer, hereinafter referred to.

The pawl-carrier 47 is designed to advance the turret the proper distance, but to insure that it shall come to rest at each quarter revolution in exact position so that the parts shall properly function, a fixed, vertically-disposed post 109 (Fig. 1) is employed, the upper end of the post being beveled or inclined so that it may readily enter the opening in the lug or hub 63 which at that time stands immediately above it. As the post stands at a distance from the axis of the turret it will insure absolute positioning of the parts. A similar arrangement of post and pawl-carrier is set forth in Letters Patent granted to Rufus L. Patterson under date of March 23, 1897 and numbered 579,546.

A shaft 110, see Figs. 5, 12, 15, 16 and 25, is passed through a sleeve 111, which in turn finds its bearing in a hollow post or column 112 secured to the upper face of the table. Vertical endwise movement is imparted to said shaft 110 by means of the cam 36, which acts upon a roller 113 carried by a lever or arm 114, fulcrumed upon shaft 57, the opposite end of said lever being connected to the shaft 110 by a link 115.

The upper end of shaft 110 carries a spider-frame 116, to which are attached a packer 117 (Fig. 1), a folder shaft 118, a shaft 119 which carries the indenting or crimping device, and the package-ejector 120, all of which will be hereinafter set forth in detail.

The lower end of the sleeve 111 carries a bevel-pinion 121 and a gear 122, the gear lying immediately above the pinion and both being made fast to the sleeve. As will be seen upon reference to Fig. 27, the gear 122 meshes with an idler 123 which in turn engages the gear 45 and consequently gear 122 is given a partial revolution every time the pawl-carrier 47 advances the shaft 50 and its attendant parts. The sleeve 111 is, therefore, given a step-by-step rotation equal to and in time with the movement of the bag-form carrying turret. Said sleeve 111 is formed as a downward extension of a turret or casting 124, which may be termed the package-carrying turret. It is provided with four radially-disposed pockets in each of which is mounted a package-receptacle 125, the pockets being defined by the vertically-disposed walls 126 which, in the form illustrated, are integral parts of the turret casting.

Figures 5, 6:
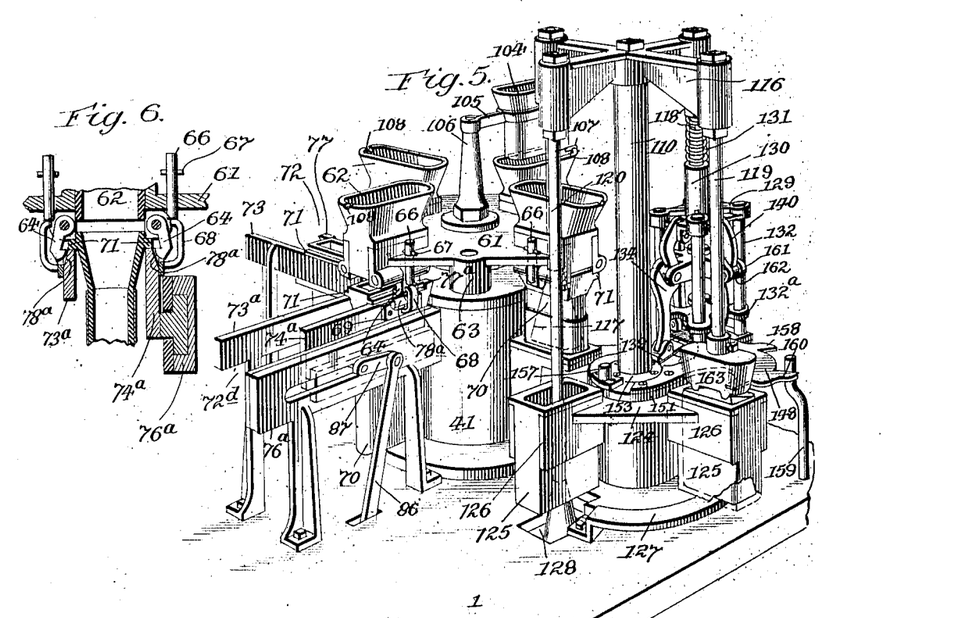
Fig. 5 a perspective view of the form-carrying turret, the package-carrying turret, and the allied parts.
Fig. 6 a transverse vertical sectional view of the form-discharging tracks, showing one of the forms just as it is detached from the turret.

Secured to the upper face of the table 1, beneath the turret 124, is an anvil or support 127, said support extending from a point beneath the packer 117 around nearly to an opening 128 formed in the bed of the table in line with the package-ejector 120, see Fig. 5. The anvil or support is concentric with shaft 110, so that it stands beneath the pockets and the bags carried thereby except when the pockets and the contained bags come into alinement with the ejector, as just noted.

The packer 117, best shown in Fig. 1, is provided with a base of a size just sufficient to pass into the form. The packing of the form is effected when the bag-shape or form, with the bag thereon, is in the position shown in Figs. 1 and 5. At such time the bag and form will be within one of the open-ended package-receptacles 125, with the bottom of the package resting fully and squarely upon the anvil or support 127. When the bag and bag-shape have reached this position, shaft 110 is lowered, carrying with it the spider-frame 116 and consequently lowering the packer 117. After the packer has completed its full stroke it comes to rest and the form-carrying turret is moved upwardly. Inasmuch as the packer remains stationary at this time, the compressed charge of material and the bag upon which it bears at the bottom will be held against movement, and the bag-shape or holder 70 will be withdrawn therefrom, leaving the compressed charge in the bag, or nested bags, in the package-receptacle 125. The form-carrying turret is raised to its highest point of elevation and the shaft 110 is then moved to its uppermost position, the parts at such time occupying the positions shown in dotted lines in Fig. 1. The turrets are then rotated through the action of the cams and the connections before described, the turret 61 moving so as to bring the stripped and emptied form or bag-carrier in line with the discharging mechanism, upon which the stripped form or bag-carrier is lowered, while the turret 124 brings the open-ended, unfolded bag or receptacle beneath the folding mechanism carried by the shaft 118, where it comes to rest. This folder mechanism is best shown in Figs. 5, 12 to 19 inclusive, 22 and 25.

Slidably mounted upon shaft 118 is a frame 129, provided with an elongated sleeve or hub 130. A spring 131 encircles the upper end of the shaft 118 and bears at its lower end against the upper end of hub 130, thereby tending to force the same downwardly. The frame 129 is provided with four downwardly-extending arms 132, which when the shaft 110 and spider-frame 116 are lowered, come into contact with the upper edge of the package-receptacle 125 and thus prevent further downward movement of the frame 129 and its attendant parts. A spider frame 132ª will preferably be employed to maintain the lower ends of the arms in their proper position and relation, see Fig. 5. Frame 129 has also pivotally attached thereto four depending arms 133, 134, 135 and 136. Arms 133 and 134 are alike in form, and the central portion thereof is inclined inwardly and a finger 137 extends upwardly and outwardly therefrom, forming a slot 138. Each arm carries at its lower end a folder blade 139 which is so weighted as to normally cause the blade to take the position shown in dotted lines in Fig. 12. In other words, the inner end of the folder blade projects upwardly so that when the blades are lowered and act against the upstanding sides of the bag they will strike the edge of the bag in an inclined position and thus will not injure the bag. The arms 133 and 134 with their folder blades 139, during the initial downward movement, maintain the positions shown in full lines in Fig. 12, and will thus make the initial folds upon the opposite narrow edges of the package. They are afterward thrown outward to the positions shown in dotted lines in said figure by devices which will be presently described.

Figures 12, 13, 14, 15, 16, 17:
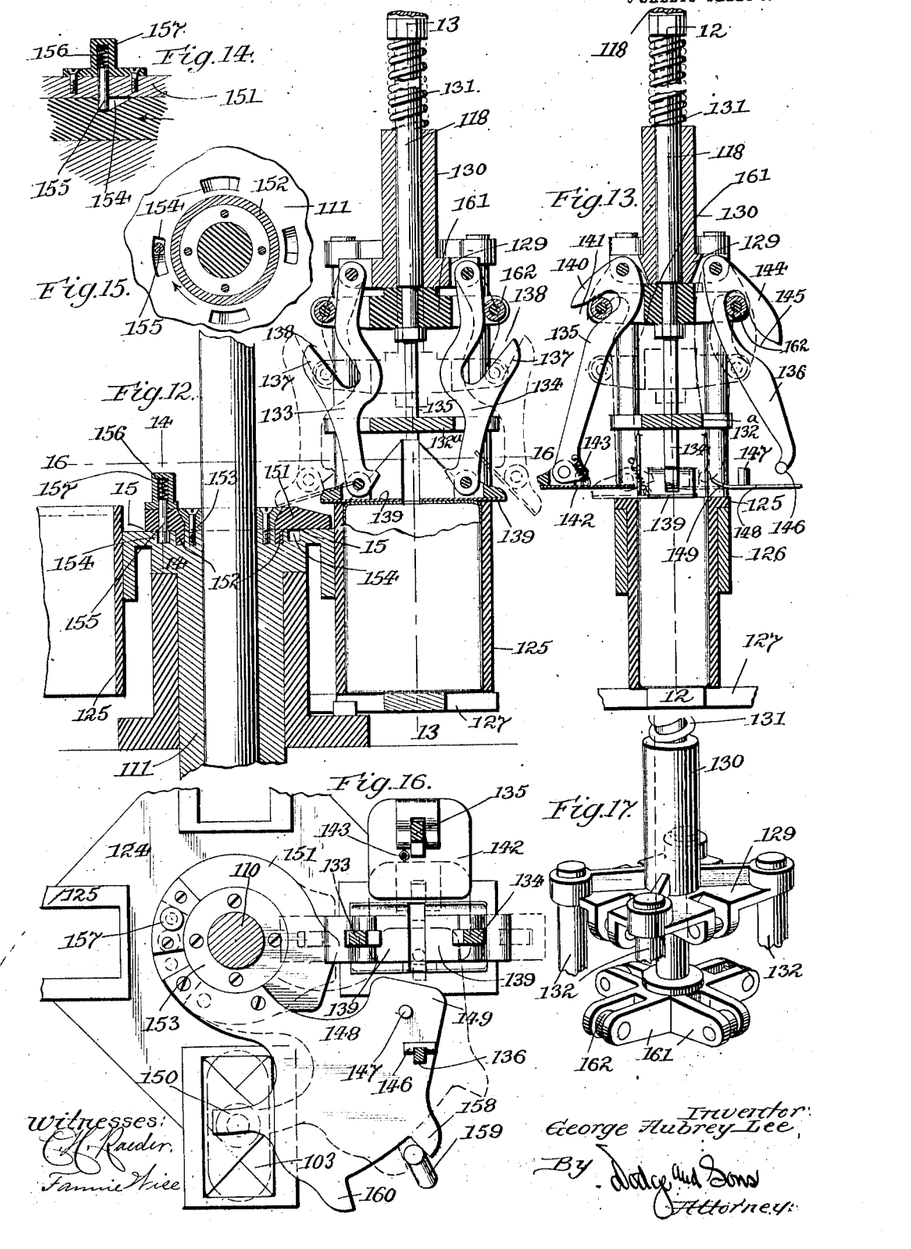
Fig. 12 a similar view, on the line 12—12 of Fig. 13.
Fig. 13 a like view, on the line 13—13 of Fig. 12.
Fig. 14 a vertical sectional view, on the line 14—14 of Fig. 12, showing the detail of construction employed for actuating the combined folding and ironer plate.
Fig. 15 a horizontal sectional view, on the line 15—15 of Fig. 12.
Fig. 16 a similar view, on the line 16—16 of Fig. 12.
Fig. 17 a perspective view of the supporting head and actuator for the folder arms.
Figure 18:
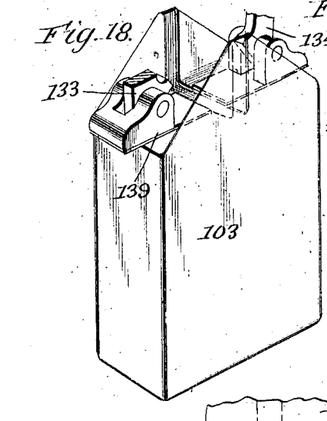
Figs. 18 to 20 inclusive perspective views of the package, showing it in different stages of completion.

Arm 135 is provided, adjacent to its upper end, with a downwardly and outwardly projecting finger 140, thereby forming a slot 141 between the inner edge of the finger and the body of the arm. Pivotally connected to the lower end of said arm is a folder-blade 142 which, as will be seen upon reference to Fig. 16, is somewhat broader than the blades 139, for the reason that it acts upon the broad side of the package, whereas the other blades act upon the narrow sides or edges of the package. A spring 143 is employed to hold the blade in a substantially horizontal position and prevent its inner edge from dropping down, as it would otherwise do, owing to the preponderance of weight being on that side of its pivot. Arm 136 is of the form best shown in Fig. 13, it being provided with a downwardly and outwardly projecting finger 144, somewhat longer than the finger 140, thereby forming a curved slot 145 between the inner edge of the finger and the adjacent side of the arm. The arm is provided at its lower end with a cross-bar 146 which stands in the path of a stud or post 147, extending upward from a plate 148 which serves both as a folder plate and an ironer plate. Said plate is of the form best shown in Fig. 22, and has a folder-blade 149 extending from one side thereof and designed to form the last fold upon the package. It is also provided with a finger 150, which overlies the previously-folded package and maintains the folds in their proper position so long as the package remains under said finger.

The plate is connected at its inner end to an annular or ring-shaped actuating member 151, which as will be seen upon reference to Fig. 12, is provided with a downwardly-projecting rib 152, seated in a corresponding recess formed in the upper end of the sleeve 111. It is maintained in position upon said sleeve by a collar 153 which is secured to sleeve 111 by suitable screws or the like. The upper end of the sleeve 111 is provided with four inclined sockets or recesses 154, see Figs. 14 and 15, and a pin 155 mounted in the member 151 is pressed downward into one or another of the recesses 154 by a spring 156 carried by a housing 157 secured to the upper face of said ring-shaped member 151. This spring-pressed pin is designed to impart movement to the ring-shaped actuating member 151 and the plate 148 carried thereby. As the sleeve 111 is rotated, as above set forth, the pin bearing against the inclined face of the recess 154 in which it is then resting will cause said member 151 to move with it and draw the plate 148 around until a finger 158 formed upon the plate comes into contact with a stop arm 159 which extends upward from the bed of the machine, see Fig. 5. When the finger 158 comes in contact with said stop arm the pin will ride out of the recess, putting the spring under compression and permitting the sleeve 111 to move onward independently thereof. A reverse movement of the plate 148 and consequently the member 151, through the action of the cross-bar 146 upon the post 147, will cause the folder-blade 149 of said plate to make the last fold upon the bag or package. This inward movement of the folder-blade is limited by a stop finger 160 formed upon the plate which coacts with the stop arm 159. As the plate and the actuating member 151 are moved by the arm 136 in the act of making this final fold, the pin 155 will pass down into the next recess in the sleeve 111 preparatory to being again moved with said sleeve.

Figures 21, 22, 23, 24:
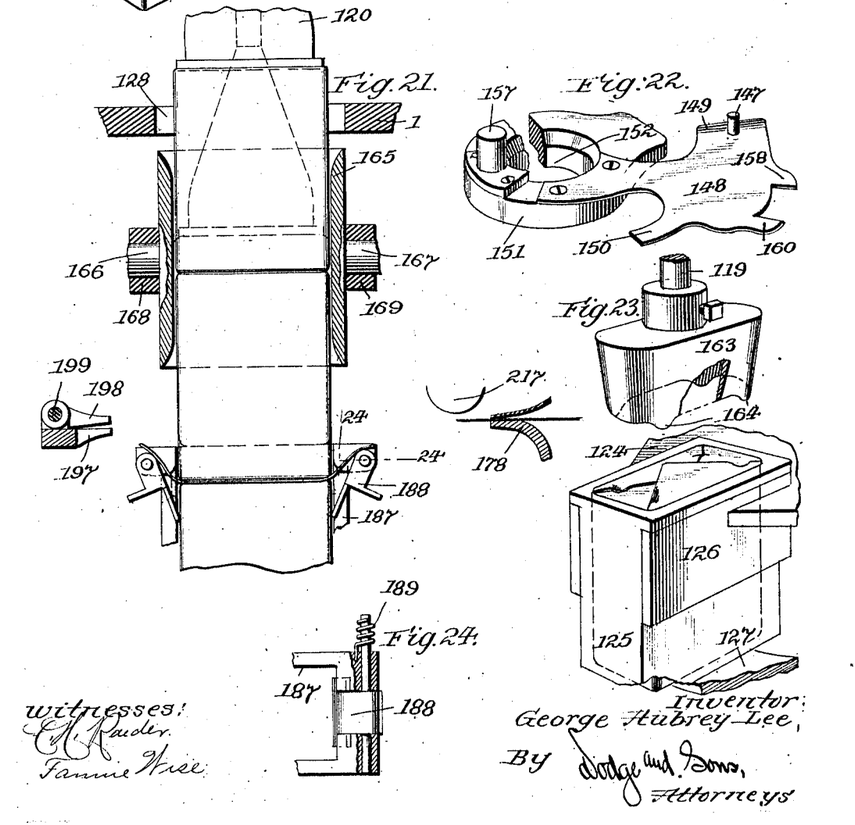
Fig. 21 a vertical sectional view of the package-presenter or tumbler and the stamp-applying mechanism, illustrating the manner in which the packages move one another through the tumbler.
Fig. 22 a perspective view of the combined folder and ironer plate and its supporting and actuating member.
Fig. 23 a similar view of the package-holder and the indenter.
Fig. 24 a detail sectional view, taken on the line 24—24 of Fig. 21.

Secured to the lower end of the shaft 118 is a casting having four double or U-shaped fingers 161, each double finger carrying a roller 162 adjacent to its outer end. These rollers, as will be seen upon reference to Figs. 12 and 13, bear against the arms 133, 134, 135 and 136, the bodies of the arms passing down in rear of the rollers. By reason of the formation of the slots 138, 141 and 145 before referred to, upon the continued downward movement of the fingers and the rollers after the head or frame 129 has come to rest, the arms 133 and 134 will be thrown outward to the dotted line position after they have made their folds and the arm 135 will be moved inwardly, after which the arm 136 will be moved inward. Any upward movement of the shaft 118 will, of course, reverse the movement of these parts, and bring the folders to such position that they will be ready to again act upon the further downward movement of the shaft 118 and its attached parts. After the package has been thus folded, the turret 124 is given a quarter rotation, the package passing under plate 148 and coming in line with the indenter or crimper 163 secured upon the lower end of the shaft 119. As said shaft is lowered, the plate 148 is swung out of the way, through the action of the arm 136, and the projections 164 formed upon the lower edge of the indenter, as best shown in Fig. 23, indent the edges of the folded portions of the package, which indentations will serve to prevent the package from unfolding as it passes to the ejector which forces the package from the receptacle into a tumbler-box preparatory to having the stamp applied thereto. By the use of this device the necessity for the employment of paste to hold the flaps closed is obviated. It is to be noted that while the indenter is acting the package still rests upon the anvil or support 127. Further rotation or a quarter revolution of the turret 124 brings the folded and indented package in line with the opening 128 formed in the table and upon the downward movement of the shaft 110 the rod or ejector 120 will dislodge the package from the package-receptacle 125 and carry it into and partially through an open-ended box or tumbler 165. The tumbler stands in alinement with the opening 128 formed in the table and is supported by stud-axles 166 and 167 mounted in suitable brackets 168 and 169 secured to the frame of the machine. A bevel-gear 170 (see Fig. 25) meshes with the pinion 121 carried by the sleeve 111, and periodical or partial rotation is imparted to the tumbler through this connection. Stud-axle 167 carries a bevel-pinion 171 which meshes with a corresponding pinion 172 mounted upon a shaft 173. Said shaft at its opposite end is provided with a sprocket-wheel 174 about which passes a sprocket-chain 175, said chain also passing about a sprocket-wheel 176 secured upon one end of a shaft 177. Said shaft overlies a stamp-box 178 and has secured to it a block 179 provided with a yielding face 180 adapted to bear upon the uppermost stamp contained in the box. The stamps within the box are pressed upwardly by a plunger 181 mounted upon the upper end of a rod 182 which is normally pressed upwardly by a weight 183 mounted upon one end of a lever 184 which at its opposite end is connected to the rod 182 by an interposed link 185. A knife, 186, which extends down through the uppermost stamps or labels prevents the same from buckling and permits but one to be fed forward at a time. As usual, one side of the stamp-box is removable or hinged, to afford a ready means of replenishing the supply of stamps from time to time. The upper end of the stamp-box lies in a plane slightly below the lower end of the tumbler, and stands to one side thereof, see Figs. 25 and 27, while directly below the tumbler is located the stamp-applying mechanism. Said mechanism comprises an open-ended oblong chamber or box-like structure 187, provided at its upper end with two oppositely-disposed fingers 188 which are normally projected into the box or receptacle by springs 189 attached to their pivot-pins, as shown in Fig. 24. This box-like receptacle forms the upper portion of the chute or way 99, hereinbefore referred to; in other words, the two are continuous.

The means for withdrawing the stamp from the stamp-box 178, applying paste thereto by the roll 217, and properly positioning the same beneath the package or over the stamp-applying box 187 may be the same as that shown in U. S. Letters Patent No. 872,521, granted to me under date of December 3, 1907.

Figures 25, 26:
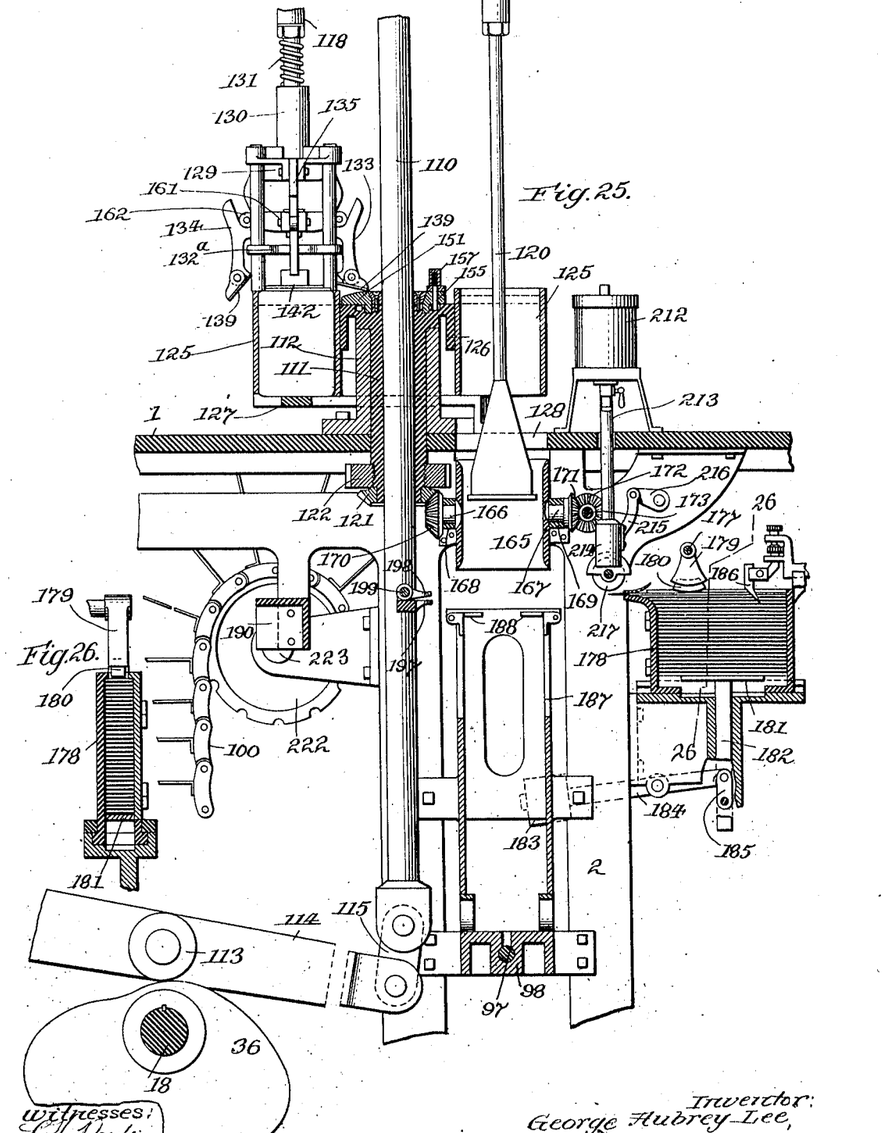
Fig. 25 a vertical sectional view, on an enlarged scale, on the line 25—25 of Fig. 1.
Fig. 26 a similar view on the line 26—26 of Fig. 25.

Referring to Fig. 25, the paste passes from the receptacle 212, through the tube 213, to the roll 217, which is carried by a head 214 supported by a bracket 215 pivotally connected to an arm 216 which in turn is pivotally connected to one of the legs 2. The stamp, as in the patent above referred to, is grasped by the jaws 197 and 198, the latter being mounted upon a shaft 199, as shown in Figs. 21 and 25.

As the package is forced out of the tumbler 165 by the next package above, which latter is being moved downward by the ejector 120 (Fig. 21), the folded and indented end of the package in the tumbler (the tumbler having been turned over) comes into contact with the stamp and being forced downward entirely within the box or receptacle 187 the ends of the stamp are drawn around the sides thereof by the spring-pressed fingers 188. After the packages are thus positioned, the ejector 120 is raised to its full height, the package which has just had the stamp applied thereto being wholly within the box 187, while the other package in the tumbler 165 protrudes below the lower end of the tumbler. The projecting end of this latter package, as the tumbler is turned prior to the descent of the ejector 120, passes into the opening 128 formed in the table. When the ejector again descends, moving a newly-folded package from the second turret, said newly-folded package abuts against the protruding end of the package in the tumbler and forces said package entirely through the tumbler and into the stamp-applying box 187 in the manner just set forth, the stamp being applied to the package as it is forced downward. The package, with the stamp thus applied over the infolded ends, remains in the box or receptacle 187 until the next package is forced downward by the ejector 120. From this it will be seen that the fingers 188 act as wipers to carry the ends of the stamp down against the sides of the package.

As will be seen upon reference to Fig. 1, the runway or chute 99 is formed as a continuation of the lower end of the box or receptacle, and as before stated the bunter 96 forces the packages along said chute into the elevator.

The endless chain 100 passes about a sprocket-wheel 222 supported upon a shaft 223 extending outwardly from a bracket secured to the frame of the machine. A second sprocket-wheel 224 is mounted upon a shaft 225, the lower stretch of the chain passing about said wheel. The shaft 225, as will be seen upon reference to Fig. 10, is mounted upon suitable boxes or bearings secured to the frame of the machine, and is likewise provided with a ratchet-wheel 226 which coacts with a pawl 227, Fig. 2, carried by a pawl-carrier 228 swiveled upon shaft 225. Said pawl-carrier is connected by a link 229 to the lever 195. Consequently, for each complete oscillation of the lever the elevator will be advanced one step.

From the foregoing description it will be noted that the packages are moved endwise against each other and remain in such position until they are passed into the elevator. This relation maintains a certain pressure upon the stamps and, consequently, permits the adhesive upon the stamps to dry so that they are firmly held to the package. As the packages pass down through the box or receptacle 187 the ends of the stamps are held in contact with the walls thereof and their ends likewise come into contact with the vanes 101 of the elevator.

The operation of the machine above described is as follows: The material to be packed is fed into the measuring chambers from any suitable source and from said chambers it passes into the scale-pans 7 which successively discharge into the main hopper. Meanwhile the attendants, one at station 72ª, designated as the "shape-discharging station," places the inner bag upon the form and passes the same to the attendant at station 72, where the outer bag is slipped over the inner one. The form or bag-carrier is then placed upon the tracks 73, 74, and as above set forth, is moved inwardly to a point beneath the form-carrying turret which is lowered so as to cause the hooks to engage the projecting wings upon the form. The turret then rises and when it reaches the highest point of elevation is given a quarter turn so as to bring the hopper 62, with the attached form, directly beneath the hopper 104. At this time one of the scale-pans discharges and the exact amount of material passes through the main hopper, the hopper 104 into the hopper or funnel 62, and into the bag-shape or holder. As the turret rises, the locking pins 66 move downward and pass behind the hooks 64, thereby preventing said hooks from moving outwardly. As the form-carrying turret rises the attendant at station 72 places another form, with the bags thereon, in position to be again fed in beneath the hopper or funnel 62 as the same is lowered. This is done at each quarter revolution of the turret, so there will always be one form with the bags thereon in position to be engaged by the turret every time it is lowered. The bag receives the greater proportion of its charge while the turret is in an elevated position, so that any material which may be discharged from the hoppers will have sufficient time to be fed into the bag during the lowering and raising of the turret previous to its making another quarter revolution, which would carry the charged bag-shape or carrier into line with the packer. After the bag-carrier with the bags thereon comes into line with the package-carrying turret 124, the turret 61 is lowered and the form with the bags thereon passes into one of the receptacles 125 which stands immediately below the same, coming to rest upon the anvil 127. The spider frame 116 then descends, carrying the packer downward with it, the packer passing into the bag and compressing the material within the bag-shape or holder 70. After the packer has reached the limit of its downward movement it comes to rest and the form-carrying turret 61 moves upward, withdrawing the form or bag-holder 70 from the bag, the material being forced outward from the open end thereof by reason of the fact that the packer remains stationary. The parts are so proportioned that the charge will be freed from the form before the packer begins its upward movement. It will thus be seen that the measured and compressed charge is placed within the bag and the bag, with its charge, remains in the receptacle 125 which is then held in one of the recesses formed in the turret 124. After the form has cleared the bag and receptacle 125, the turret 61 is rotated to such position as will bring the stripped form or bag-carrier into line with the form-discharging mechanism hereinbefore referred to. The turret is then lowered and the shape automatically released therefrom, the hooks at such time taking the positions shown in Fig. 6. As the turret 61 is rotated turret 124 is also rotated, bringing the package in line with the folding mechanism hereinbefore described, the operation of which it is believed will be readily understood without further detailed description. After the bag is folded and the blades, with the exception of the combined folding and ironing blade, withdrawn the package or bag is carried to a position directly beneath the indenter, which upon the next descent of the frame 116 causes the indenter 163 to act upon the infolded edges of the package and to crimp or upset the same, as before stated. As the completed package passes from beneath the combined folding and ironing plate 148 it comes into line with the open ing 128 formed in the table in line with or beneath the ejector 120. The ejector then descends, forcing the package out of the receptacle 125 and into the tumbler 165. Before this is done, however, the stamp-presenting member or block 179 will have protruded the uppermost stamp into a position where it may be grasped by the jaws 197 and 198. The jaws are then moved to the left, carrying the stamp to a position directly below the mouth of the tumbler, the paste meanwhile having been applied to the upper face of the stamp by the action of the roll 217. The next package which is pushed downward by the ejector will force the previously-positioned package in the tumbler downward in the manner shown in Fig. 21, the folded end of the completed package coming into contact with the pasted stamp and passing with the stamp between the fingers 188 into the box or receptacle 187. The package with the stamp thus applied thereto will remain within the box until the next succeeding package is forced downward by the ejector. As this action is continued, the packages, as above noted, will pass out onto the runway or chute 99 and be transferred therefrom by the bunter into the elevator. As above noted, the elevator is advanced step by step, so that the packages will remain therein for a sufficient period of time to enable the stamps to become thoroughly dried before the packages are removed.

It is conceivable that many of the details of the machine may be varied without departing from the spirit of my invention. For instance different stamp-applying and presenting mechanism may be employed, and instead of driving both turrets from the same cam it is conceivable that separate cams may be used. A separate cam might likewise be employed for actuating the tumbler and its attendant parts, but as these matters fall within the province of the mechanic it is not deemed essential to specifically show and describe such modifications herein.

It is possible that certain portions of the mechanism may be applicable to the treatment of packages other than bags having one end closed before they are placed in the machine, and the term "bag" should be given a wide significance in those claims where such a scope is permissible. In other words, it will be understood to cover any receptacle adapted for the purposes intended.

No claim is made herein to the weighing mechanism disclosed in Fig. 1, as that forms the subject - matter of Letters Patent No. 860,392, granted to me under date of July 16, 1907.

Having thus described my invention, what I claim is:

1. In a machine for packaging material, the combination of a form-carrier; a form; weighing mechanism; a packer; a package-receiving turret; means to move the form-carrier to present the forms successively to the weighing mechanism and to the packer; a bag-folding mechanism adapted to close the bag after the material therein has been packed; and an indenter arranged to act upon the folded portion of the bag.

2. In a machine for packaging materials, the combination of folding mechanism, serving to infold the open end of a package; and means movable toward and from the package while the same is at rest, for indenting or crimping the marginal portions of the infolded flaps.

3. In a machine for packaging materials, the combination of folding mechanism; and a head having a plurality of blunt projections formed upon its lower face, said projections serving to indent or crimp the inturned flaps of the package preparatory to permanently closing the same.

4. In a machine for packaging material, the combination of a turret; means for raising and lowering said turret; means for imparting a partial rotation to said turret when in its raised position; a bag-shape or form; hooks carried by the turret for engaging the bag-shape or form; and means for positively locking said hooks after they have engaged the form.

5. In a machine for packaging material, the combination of a turret; means for raising and lowering the same; hooks carried by the turret adapted and arranged to engage a bag-shape or holder; gravitating locking pins carried by the turret and normally standing in rear of the hooks; and means for raising said pins out of their locking position as the turret is lowered.

6. In a machine for packaging material, the combination of a turret; means for raising and lowering the same; hooks carried by the turret for engaging a bag-shape or form; gravitating pins also carried by the turret and normally standing in line with the hooks and preventing their disengagement from the bag-shape or form; arms secured to a fixed portion of the machine and standing in line with the lower ends of the pins, said arms serving, as the turret is lowered, to engage said pins and to elevate them with reference to the turret; and means for automatically disengaging the form from the turret and withdrawing the form therefrom, substantially as described.

7. In a machine for packaging material, the combination of a bag-shape or form carrying turret; a bag-form; means for feeding a measured charge of material to the form and bag carried by said turret; a second turret adapted and designed to receive the bag with its contained charge; means for rotating said second turret step by step; a vertically-disposed shaft; means for raising and lowering said shaft; a packer carried by said shaft; a bag-folding mechanism also carried by the shaft; an indenter carried by the shaft and serving to indent the infolded portions of the bag; an ironer; and means for ejecting the bag from the second turret.

8. In a machine for packaging material, the combination of means for filling a bag with a charge of material; a turret adapted to receive and hold said bag with its contained charge; a shaft extending upwardly in line with the axis of said turret; a packer carried by said shaft; a folding mechanism likewise carried by the shaft; an indenter for the folded bag; an ejector; means for periodically raising and lowering said shaft; and means for imparting a partial rotation to the turret while said shaft with its attendant parts is in its raised position.

9. In a machine for packaging material, the combination of mechanism adapted and arranged to place a charge of material within a bag, to close the same and to indent said closed portion; a tumbler arranged to receive the package thus formed and to turn the same end for end; and a stamp-applying mechanism standing in line with said tumbler.

10. In a machine for packaging material, the combination of means for holding a package; means for rotating said means from one to another position; a laterally-swinging plate overlying the upper edge of the package and serving as a folder when swung to one position and as an ironer for the folded end of the package as the package is moved beneath the same; and means for indenting or crimping the edges of the infolded portions of the package.

11. In a machine for packaging material, the combination of means for supporting a package; means for inwardly folding three sides of the upstanding edges of the package; a laterally-oscillating plate folding the remaining side of the package and holding the same in a closed position; means for traversing the package beneath said plate; and means for crimping the inturned edges of the package as the plate is withdrawn from over the same.

12. In a machine for packaging material, the combination of a rotary support for holding a package; means for rotating said support step by step; mechanism acting to infold the upstanding edge of three sides of the package; and an oscillating folder-plate overlying the upper edge of the package, said plate serving, when moved in one direction, to fold the remaining side of the package and to hold the package in its closed position for a stated period of time.

13. In a machine for packaging material, the combination of means for supporting a package; means for advancing said supporting means step by step from one position to another; mechanism for infolding three sides of the upstanding edge of the package; a plate overlying the package-holding means; means for advancing said plate in one direction to fold inwardly the remaining upstanding side of the package; and means for moving the plate in the opposite direction to maintain the package in its closed position.

14. In a machine for packaging material, the combination of means for folding three sides of a package and provided with a folder blade at one end for infolding the remaining side of the package, said means being likewise provided with a retaining finger at its opposite end for holding the last infolded edge of the package; and an indenter adapted to indent the infolded edges of the package when the same is freed from the retaining finger.

15. In a machine for packaging material, the combination of a turret provided with a series of pockets for receiving and holding packages; means for rotating said turret step by step; mechanism arranged to fold three sides of the upstanding edge of the package; a plate provided with a folding blade serving to fold the remaining upstanding portion of the package; a retaining finger carried at the opposite edge of the plate; means for advancing the plate in one direction to cause it to fold the package; and means for advancing the plate in the opposite direction, whereby the finger will be retained over the folded end of the package for a given period of time.

16. In a machine for packaging material, the combination of a turret arranged to hold the packaged material; means for advancing the turret step by step; a folder arranged to fold three sides of the upstanding edge of the package; a plate provided with a folding blade or edge at one side and with a retaining finger at the opposite side; a supporting ring mounted upon the turret to which said plate is secured; frictional driving connections between said ring and the turret; means for moving the plate in a direction opposite to that imparted by said frictional driving means; and an indenter arranged to act upon the infolded portions of the package.

In testimony whereof I have signed my name to this specification in the presence of two subscribing witnesses.

GEORGE AUBREY LEE.

Witnesses:
 JAMES S. FITCH,
 HORACE A. DODGE.